June 16, 1925.

J. BRENZINGER 1,542,664

METHOD AND MEANS FOR SOLDERING THE SEAMS OF METALLIC BODIES

Filed March 22, 1922   3 Sheets-Sheet 1

INVENTOR
Julius Brenzinger
BY
ATTORNEY

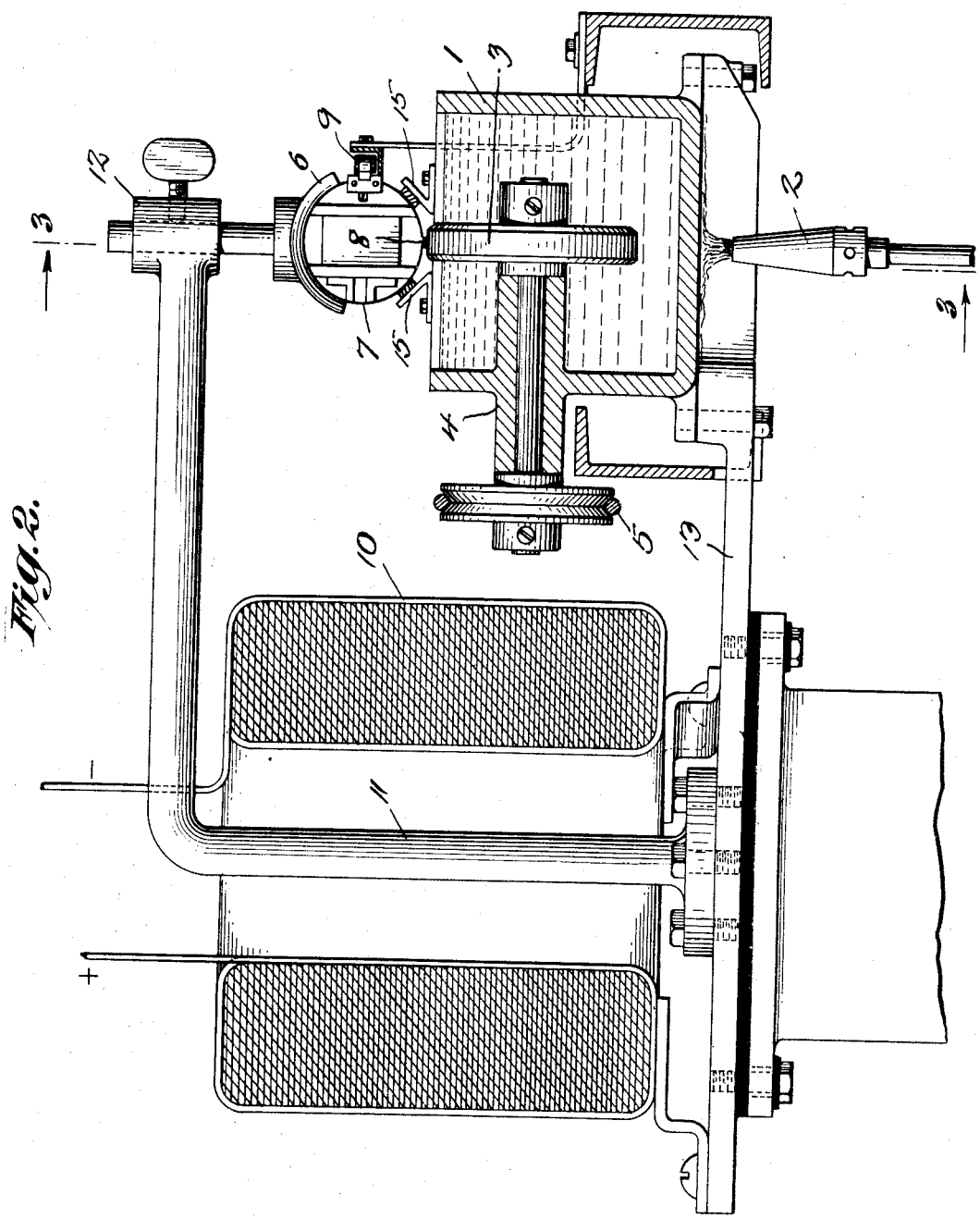

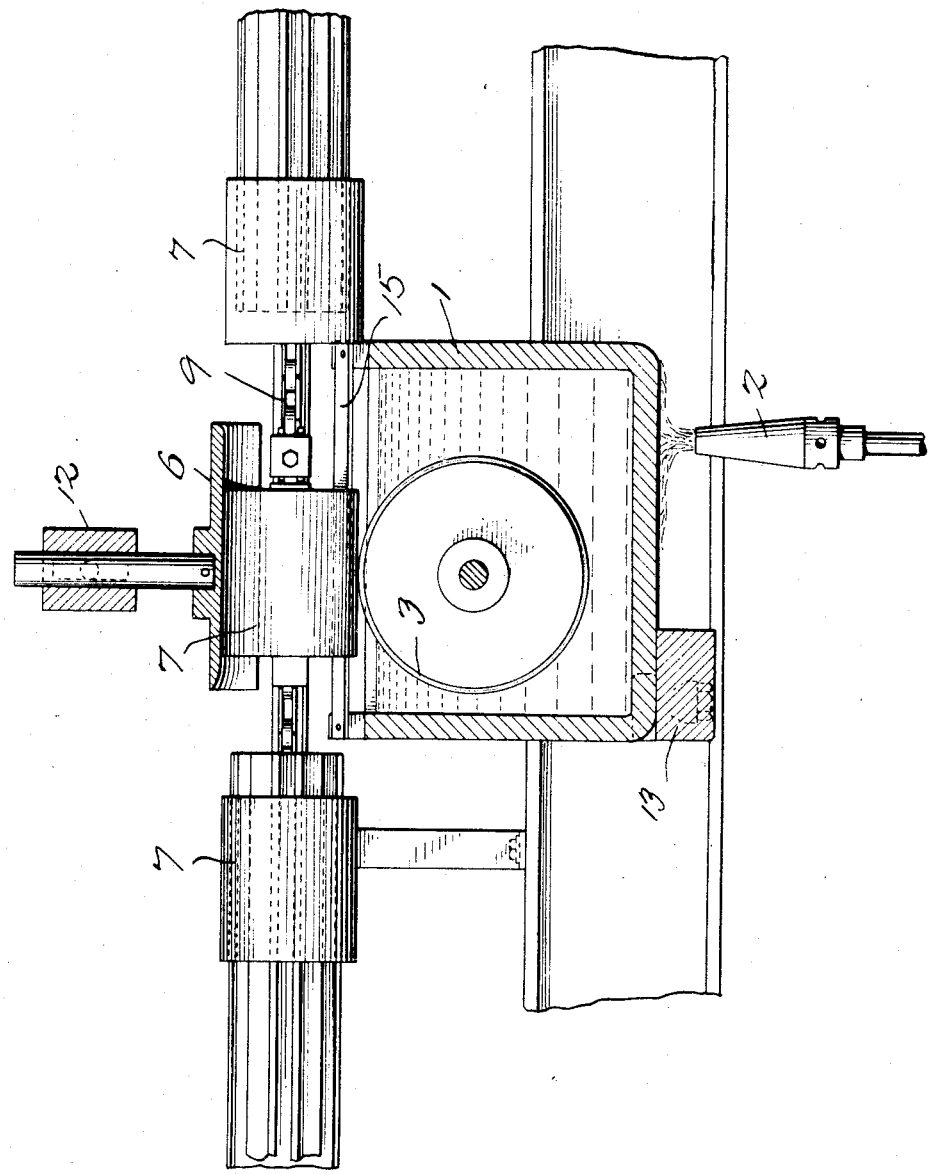

Patented June 16, 1925.

1,542,664

UNITED STATES PATENT OFFICE.

JULIUS BRENZINGER, OF FAIRFIELD, CONNECTICUT, ASSIGNOR TO THE MAX AMS MACHINE COMPANY, OF BRIDGEPORT, CONNECTICUT, A CORPORATION OF NEW YORK.

METHOD AND MEANS FOR SOLDERING THE SEAMS OF METALLIC BODIES.

Application filed March 22, 1922. Serial No. 545,718.

*To all whom it may concern:*

Be it known that I, JULIUS BRENZINGER, a citizen of the United States, and a resident of Fairfield, in the county of Fairfield and State of Connecticut, have invented certain new and useful Methods and Means for Soldering the Seams of Metallic Bodies, of which the following is a specification.

This invention relates to a method and means for soldering metallic members such as the seam of a tin can.

In the art as heretofore practiced it has been the custom to apply molten solder, maintained at a relatively high temperature, to the seam of the body, the solder being utilized for the purpose of heating the metal of the seam in order that it may adhere properly to the metallic surface. The objection to this method is that when solder is brought to the high temperature, say 600° Fahr., necessary under the circumstances, its surface becomes oxidized and it is therefore customary to cover the surface of the solder with a substance that will protect it and prevent, as far as possible, oxidation. It is also necessary to have an excessively long soldering tank in order that the requisite heat may be applied by the molten solder to the metal container.

The main object of this invention is to overcome these objectionable features and the invention consists in a method and means whereby the solder tank may be materially shortened and the solder kept at such relatively low temperature that no oxidation will take place.

In the accompanying drawings the invention is illustrated in a preferred form, the drawings being more or less of a diagrammatic character.

Fig. 2 is a transverse vertical sectional view on the plane of line 2—2 of Fig. 1.

Fig. 3 is a longitudinal vertical sectional view on the plane of line 3—3 of Fig. 2.

Figure 1:
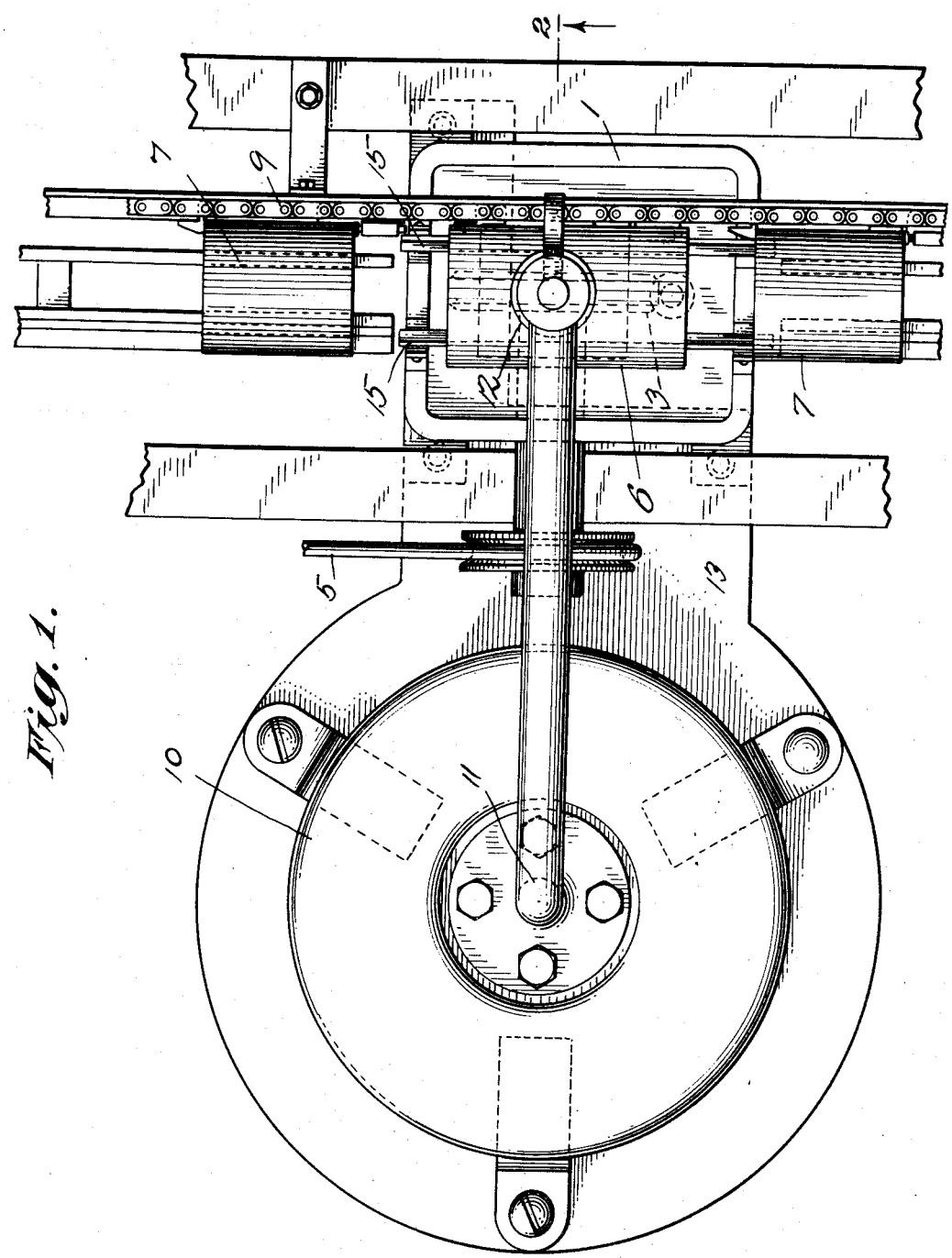
Fig. 1 is a plan view of a device embodying the invention.

1 indicates a solder tank preferably made of brass containing a body of molten solder at a suitable temperature say 300° Fahr., any suitable means such as burner 2 being used to maintain a suitable temperature. Rotatably mounted in said tank is a solder applying element here shown as roller 3 extending through sleeve 4 and rotated as by means of belt 5. Mounted in spaced relation above said roller is a guide 6 of brass or other suitable material. This guide will preferably be of such suitable shape lengthwise that a metallic body as 7 having seam 8 may be passed in contact between it and the roller. Any suitable means may be used to advance said metallic body between said roller and tank. A conveyor chain 9 which may be similar in construction to the conveyor shown in Patent No. 1,349,044, together with guides 15 may be used. The roller and the guide are included in a low voltage normally incomplete electric circuit so that when said metallic body is in contact with said members a low voltage current passes through said metallic body thereby heating the body sufficiently to cause the solder to adhere to the seam. By this means a shorter tank than heretofore used may be employed and the solder may be kept at a relatively low temperature. Any suitable means may be employed to establish the circuit. Preferably a transformer coil 10 is used, the secondary 11 of which is a brass conductor of bar-like form from which extends at one end a bracket 12 also of brass in which the guide is adjustably secured. From the other end of secondary 11 extends a support 13 of brass on which the solder tank is carried. A rheostat may be employed to regulate the voltage and thereby the heat. It will be understood that the heat thus applied should not be sufficient to fuse the metal of the body or to destroy the tin covering.

I claim:

1. The method of soldering the seam of a metallic body which consists in applying molten solder to said seam and at the same time subjecting the seam to the heating action of an electric current.

2. The method of soldering the seam of a metallic body which consists in applying molten solder of a moderate temperature to said seam and at the same time subjecting the seam to the heating action of a low voltage electric current.

3. A device for soldering the seam of a metallic body comprising: a solder tank, a solder applying roll immersed rotatably in said tank, a guide extending in spaced relation above said roll, said roll and guide adapted to receive in contact between them a metallic body, and an incomplete electric circuit including said roll and guide adapted to be closed by said body.

4. A device for soldering the seam of a metallic body comprising: a solder tank, a solder applying roll immersed rotatably in said tank, a guide extending in spaced relation above said roll, said roll and guide adapted to receive in contact between them a metallic body, an incomplete electric circuit including said roll and guide adapted to be closed by said body, and a conveyor for passing the body between said roll and guide.

5. A device for soldering the seam of a metallic body comprising: a solder tank, a solder applying roll immersed rotatably in said tank, a guide extending in spaced relation above said roll, said roll and guide adapted to receive in contact between them a metallic body, and an incomplete low voltage electric circuit including said roll and guide adapted to be closed by said body.

6. A device for soldering the seam of a metallic body comprising: a solder tank, a solder applying roll immersed rotatably in said tank, a guide extending in spaced relation above said roll, said roll and guide adapted to receive in contact between them a metallic body, an incomplete low voltage electric circuit including said roll and guide adapted to be closed by said body, and a conveyor for passing the body between said roll and guide.

7. The method of soldering metallic members which consists in applying previously molten solder to said members and at the same time subjecting them to the heating action of an electric current.

8. The method of soldering metallic members which consists in applying molten solder of a moderate temperature to said members and at the same time subjecting said members to the heating action of a low voltage electric current.

Signed at Bridgeport, in the county of Fairfield and State of Connecticut, this 18 day of March, 1922.

JULIUS BRENZINGER.